US007467379B2

(12) United States Patent
Desbiens

(10) Patent No.: US 7,467,379 B2
(45) Date of Patent: Dec. 16, 2008

(54) SYSTEM AND METHOD FOR INCREMENTALLY EXECUTING A CLIENT/SERVER APPLICATION

(75) Inventor: Robert Desbiens, Aylmer (CA)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 10/050,455

(22) Filed: Jan. 16, 2002

(65) Prior Publication Data

US 2004/0015951 A1    Jan. 22, 2004

Related U.S. Application Data

(60) Provisional application No. 60/261,994, filed on Jan. 16, 2001.

(51) Int. Cl.
*G06F 9/44* (2006.01)
*G06F 9/445* (2006.01)
*G06F 15/16* (2006.01)
*G06F 15/167* (2006.01)

(52) U.S. Cl. .................. 717/173; 717/178; 709/203; 709/216; 709/219

(58) Field of Classification Search ........... None
See application file for complete search history.

(56) References Cited

U.S. PATENT DOCUMENTS

| 5,029,282 | A | 7/1991 | Ito ..................... 307/296.8 |
|---|---|---|---|
| 5,097,303 | A | 3/1992 | Taguchi ................ 357/23.6 |
| 5,136,716 | A | 8/1992 | Harvey et al. |
| 5,204,960 | A * | 4/1993 | Smith et al. ............... 717/145 |
| 5,783,934 | A | 7/1998 | Tran ........................ 323/312 |
| 5,893,113 | A * | 4/1999 | McGrath et al. ............ 707/200 |
| 5,955,874 | A | 9/1999 | Zhou et al. ................ 323/315 |
| 5,956,509 | A * | 9/1999 | Kevner .................... 719/330 |
| 6,052,531 | A * | 4/2000 | Waldin et al. ............. 717/170 |
| 6,279,030 | B1 * | 8/2001 | Britton et al. ............. 709/203 |
| 6,282,542 | B1 | 8/2001 | Carneal et al. |
| 6,430,607 | B1 * | 8/2002 | Kavner .................... 709/217 |
| 2002/0032754 | A1 * | 3/2002 | Logston et al. ............ 709/219 |

FOREIGN PATENT DOCUMENTS

| CA | 1312144 | 12/1992 |
|---|---|---|
| CA | 2207746 | 12/1998 |
| WO | WO9858478 | 12/1998 |

\* cited by examiner

*Primary Examiner*—Chuck O Kendall

(57) ABSTRACT

A system and method for incrementally executing a client/server application leveraging existing communications network infrastructure having at least one client computer and at least one server computer. The system includes a server component comprising a plurality of portions, and provided on the at least one server computer and a client component provided on the at least one client computer, the client component including one or more command selectors. Each of the one or more command selectors has associated code for selecting a function available from the plurality of portions of the server component. Further, each of the one or more command selectors has an associated parameter for use by the server component in determining the appropriate portion of the plurality of portions to execute to provide the selected function.

20 Claims, 3 Drawing Sheets

SYSTEM AND METHOD FOR INCREMENTALLY EXECUTING A CLIENT/SERVER APPLICATION

CROSS-REFERENCE TO RELATED APPLICATION

This application claims the benefit of U.S. Provisional Patent Application Ser. No. 60/261,994 filed Jan. 16, 2001.

FIELD OF THE INVENTION

The present invention relates generally to a method of running a computer application, and more particularly to a system and method for incrementally executing a client/server application.

BACKGROUND OF THE INVENTION

In a local computing environment, such as a personal computer containing a hard disk drive and internal cache, the time required for the loading and execution of a computer application is generally not an issue. In this environment there are sufficient resources connected by high bit rate pathways for program loading and executing within a period of time acceptable to most users.

However, this is not the case for client/server applications in which the bulk of the application is run remotely on a server. Even in a communications system in which a client computer is connected and in communication with a server computer over high bit rate communication links, network bit rates typically do not compare with those found between components of a local system.

Attempts using distinct "quick-viewing" programs running separately from the main application have been made to reduce execution times for client/server applications running in the Windows environment. For Web-based environments, characteristically more sensitive to loading and execution delays, browser applets have been employed, involving a heavily coded client requiring a virtual machine separate from the browser.

The problem with these methods is that they use separate components that are large and resource intensive relative to the limited return of functionality they provide. What is needed is a method of providing a reduction in execution times for client/server applications without the requirement for separate, resource intensive components.

For the foregoing reasons, there is a need for an improved method of executing a client/server application.

SUMMARY OF THE INVENTION

The present invention is directed to a system and method for incrementally executing a client/server application. Both the system and method leverage existing communications network infrastructure having at least one client computer and at least one server computer, wherein the at least one client computer and the at least one server computer are in communications with each other over one or more communications links within the network infrastructure.

The system includes a server component comprising a plurality of portions, and provided on the at least one server computer and a client component provided on the at least one client computer, the client component including one or more command selectors. Each of the one or more command selectors has associated code for selecting a function available from the plurality of portions of the server component. Further, each of the one or more command selectors has an associated parameter for use by the server component in determining the appropriate portion of the plurality of portions to execute to provide the selected function.

The method includes the steps of providing a server component comprising a plurality of portions on the at least one server computer, providing a client component on the at least one client computer, and executing an appropriate portion from the plurality of portions of the server component applicable to and upon an initial request from the client component for an application function. The method further includes the steps of executing an applicable additional portion of the plurality of portions of the server component for each request received from the client component for an application function not available from any running portion or portions of the server component, and running all executed portions until an end session command is received.

In an aspect of the invention, one portion of the plurality of portions is a compact portion initially executed upon receipt of a first application function request from the client component, the compact portion delivering a streamlined subset of functions applicable to commands most commonly requested to provide a fast executing initial portion of the application. Should the function requested lie outside of the function set of the compact portion, an applicable additional portion is loaded and executed, combining its functions with the first portion's functions, with minimal overlap, to provide enhanced functionality. Both portions, and any additional portions, will continue to run for the remainder of the session.

The invention provides improved response times for access to client/server applications, and in particular to Web-based client/server applications, which are characteristically more sensitive to loading and execution delays.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PRESENTLY PREFERRED EMBODIMENT

The present invention is directed to a system and method for incrementally executing a client/server application. Both the system and method leverage existing communications network infrastructure 11 having at least one client computer 10 and at least one server computer 12, wherein the at least one client computer 10 and the at least one server computer 12 are in communications with each other over one or more communications links 14 within the network infrastructure 11.

Figure 1:
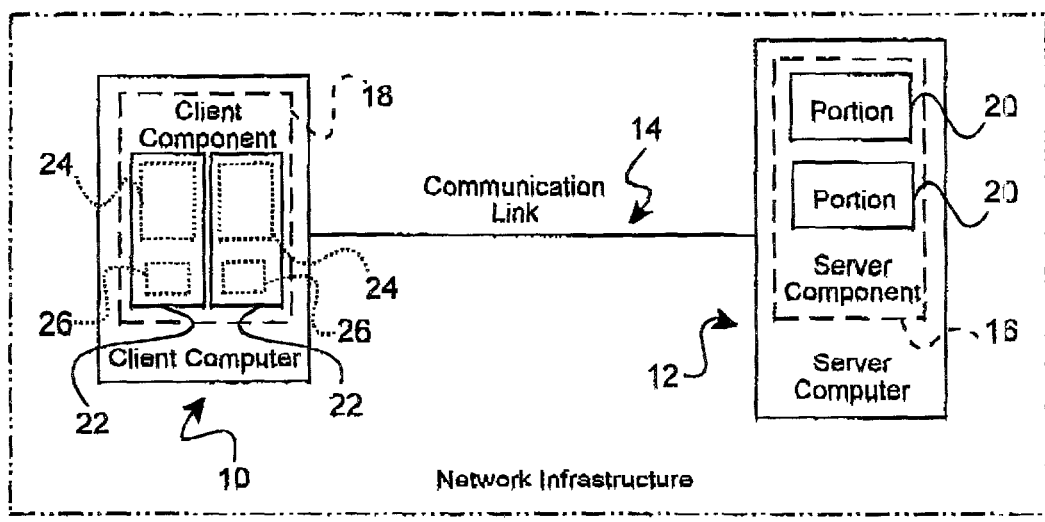
FIG. 1 is an overview of a system for incrementally executing a client/server application according to an embodiment of the present invention.

As illustrated in FIG. 1, the system includes a server component 16 comprising a plurality of portions 20, and provided on the at least one server computer 12 and a client component 18 provided on the at least one client computer 10, the client component 18 including one or more command selectors 22. Each of the one or more command selectors 22 has associated code 24 for selecting a function available from the plurality of portions 20 of the server component 16. Further, each of the one or more command selectors 22 has an associated parameter 26 for use by the server component 16 in determining the appropriate portion of the plurality of portions 20 to execute to provide the selected function.

Figure 2:
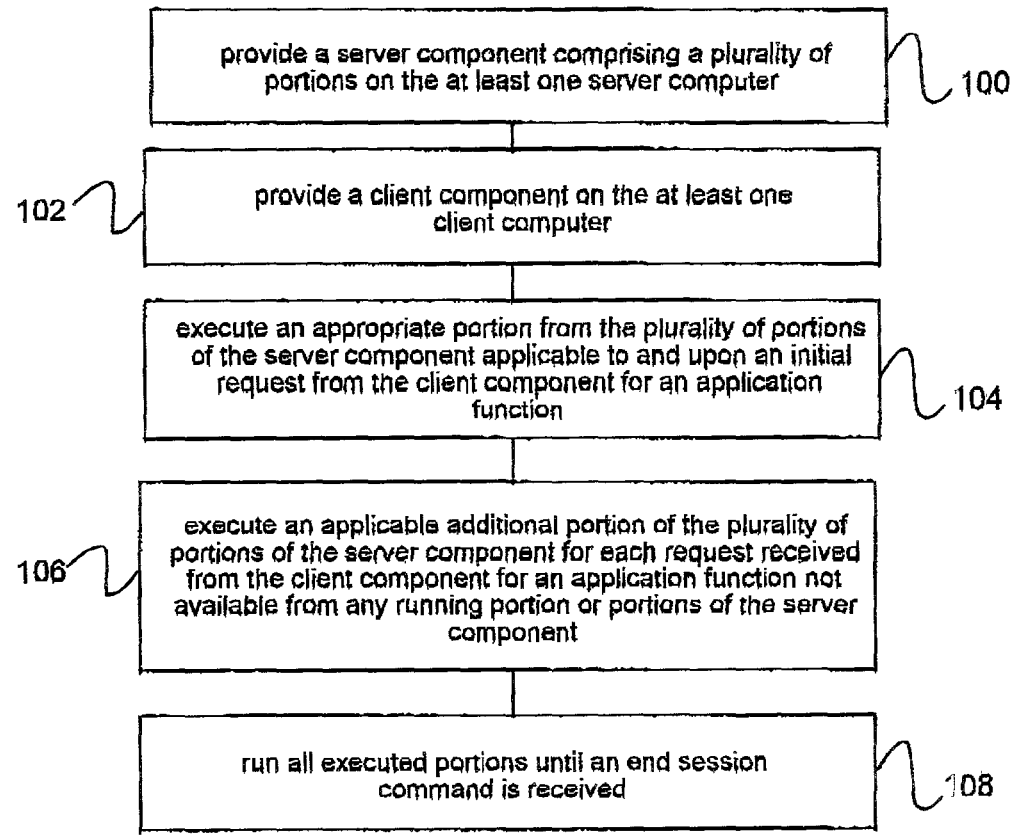
FIG. 2 is an overview of a method for incrementally executing a client/server application according to an embodiment of the present invention.

As illustrated in FIG. 2, the method includes the steps of providing a server component comprising a plurality of portions on the at least one server computer 100, providing a client component on the at least one client computer 102, and executing an appropriate portion from the plurality of portions of the server component applicable to and upon an initial request from the client component for an application function 104. The method further includes the steps of executing an applicable additional portion of the plurality of portions of the server component for each request received from the client component for an application function not available from any running portion or portions of the server component 106, and running all executed portions until an end session command is received 108.

The network infrastructure 11 can be any appropriate network that includes both a client computer and a server computer connected to and in communications with each other over one or more communication links appropriate for the network, as would be known to one skilled in the art.

Figure 3:
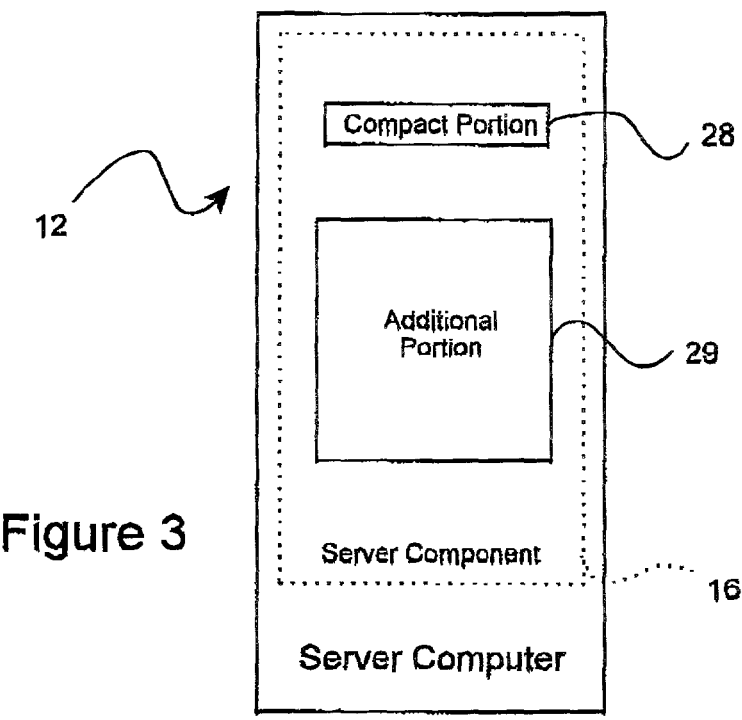
FIG. 3 illustrates an embodiment of the present invention wherein a portion of the plurality of portions is an initially executed compact portion.

As illustrated in FIG. 3, in an embodiment of the present invention, one portion of the plurality of portions 20 is a compact portion 28 initially executed upon receipt of a first application function request from the client component 18. Execution of the application occurs in stages, with a compact portion 28 of the application being initially invoked to provide a streamlined subset of functions applicable to commands most commonly requested to provide a fast executing initial portion of the application. Should the function requested lie outside of the function set of the compact portion 28, an applicable additional portion 29 is loaded and executed, combining its functions with the compact portion's 28 functions, with minimal overlap, to provide enhanced functionality.

As an example, the compact portion 28 of the application can be limited to providing document viewing functions to the client computer 10. The compact portion 28 will continue to run alone until such time as the user selects a function not available from the streamlined subset of functions of the compact portion 28. All executed portions will continue to run for the remainder of the session.

Figure 4:
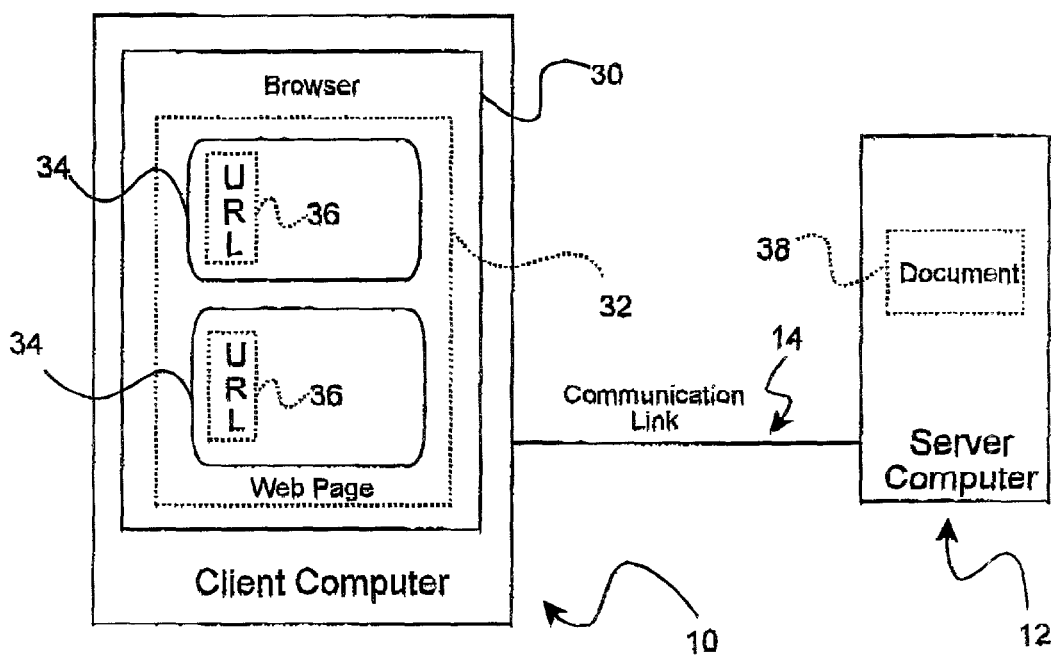
FIG. 4 illustrates a Web-based embodiment of the present invention.
Figure 5:
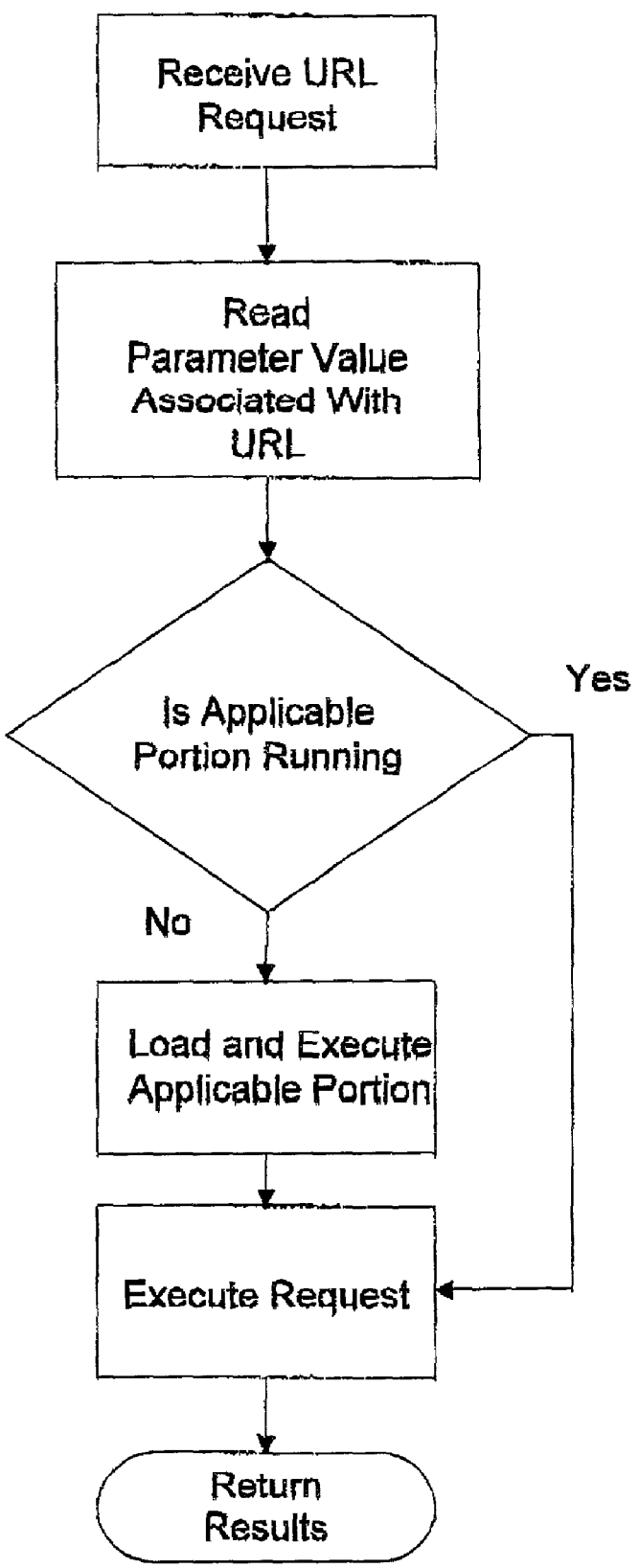
FIG. 5 is a flow chart illustrating the operation of a Web-based client/server application according to an embodiment of the present invention.

In an embodiment of the present invention, the system and method are Web-based, whereby HTML and scripting or another similar language are employed, allowing for a thinner client when compared to a browser applet. As illustrated in FIG. 4, in this embodiment the client computer 10 includes a browser 30 suitable for retrieving and displaying a Web page 32 through which the client computer 10 requests functions from the server computer 16. The Web page 32 includes one or more links 34 each having an associated Universal Resource Locator (URL) 36 that points to a document 38 hosted by the server computer 12, whereby the URL 36 invokes an appropriate query.

The selection of a link 34 forwards script 24 and an appended parameter 26 to the server component 16, which reads the value of the appended parameter 26 associated with the link 34 to determine the appropriate portion of the server component 16 to invoke to provide that function. When a user selects a link 34 on the client computer 10 associated with a function not provided by a running portion or portions of the server component 16, the applicable portion is determined, loaded and executed, with the script 24 directing which command to execute.

The application runs script with limited "crossover". As additional portions are executed, the only thing noticeable to the user is a slight delay as the original view page is replaced with a new page. As well, the invention enables a large decrease in the number of lines of script at initial runtime when compared with a full version of an application, enabling preview pages to be viewed very quickly. Where appropriate, an application can be further divided into additional portions for execution for improved efficiency as would be known to one skilled in the art.

By initially executing a compact version of the application, the invention provides improved response times for access to client/server applications, and in particular to Web-based client/server applications, which are characteristically more sensitive to loading and execution delays.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. A system including a processor for incrementally executing a client/server application, the client/server application executed on a client and a server, the client and the server in communication over a communication link, the system comprising:

a client/server application comprising a server application component and a client component, the server application component comprising a plurality of server component portions, and provided on the server, the plurality of server component portions including an initial server component portion and one or more subsequent server component portions, the initial server component portion having an initial function, each of the one or more subsequent server component portions including a respective subsequent function; the plurality of server component portions further including a compact portion loaded and executed on the server upon receipt of a first application function request from the client component, the compact portion delivering a subset of functions applicable to commands most commonly requested to provide a fast executing initial portion of the application;

the client application component provided on the client, the client component including a command selector, the command selector having:

means for selecting a function available from the plurality of the server component portions; and means for generating a parameter for use by the server application component in determining the appropriate server component portion of the plurality of server component portions to load and execute on the server to provide the selected function to the client, the parameter being an initial parameter or a subsequent parameter;

the server including:

a memory for executing the server application component;

means for receiving an initiating message from the client, the initiating message including the initial parameter associated with the initial server component portion;

means for loading into the memory, in response to the initial parameter, the initial server component portion;

means for executing the initial server component portion loaded into the memory to provide the initial function to the client;

means for receiving a subsequent message from the client, the subsequent message including the subsequent parameter associated with a subsequent server component portion;

means for loading into the memory, in response to the subsequent parameter, the subsequent server component portion; and means for executing the subsequent server component portion loaded into the memory to provide the subsequent function to the client.

2. The system according to claim 1, wherein one of the plurality of server component portions is a compact portion loaded and executed on the server upon receipt of a first application function request from the client component, the compact portion delivering a subset of functions applicable to commands most commonly requested to provide a fast executing initial portion of the application.

3. The system according to claim 1 wherein the loading of the subsequent server component portion is omitted if the subsequent function associated with the subsequent server component portion is available from any running server component portion of the server component.

4. The system according to claim 1, further comprising a plurality of clients, wherein each of the plurality of clients includes means for creating the initial parameter and the subsequent parameter at a client application.

5. The system according to claim 1 wherein the client includes:

means for accepting from a user, an indication of an end session; and means for generating an end session message, and wherein the server includes:

means for receiving the end session message; and means for terminating the execution and unloading the server component portions.

6. A method for incrementally executing a client/server application, the application executed on a client and on a server, the server comprising a server processor and a memory for executing a server component wherein the client and the server are in communication over a communication link, the method comprising the steps of:

(i) providing a server application component comprising a plurality of server component portions on the server, the plurality of server component portions including an initial server component portion and one or more subsequent server component portions; the plurality of server comnonent portions further including a compact portion loaded and executed on the server upon receipt of a first application function request from the client component, the compact portion delivering a subset of functions applicable to commands most commonly requested to provide a fast executing initial portion of the application;

(ii) providing a client component on the client, the server application component and the client component forming the client/server application;

(iii) loading the initial server component portion into the memory of the server, in response to a parameter included in a request from the client component for an application function;

(iv) executing the initial server component portion to provide an initial function to the client;

(v) loading into the memory of the server, in response to a subsequent parameter included in a subsequent request from the client component, the subsequent server component portion; and (vi) executing the subsequent server component portion to provide a subsequent function to the client.

7. The method according to claim 6, wherein one of the plurality of server component portions is a compact portion loaded and executed on the server upon receipt of a first application function request from the client component, the compact portion delivering a subset of functions applicable to commands most commonly requested to provide a fast executing initial portion of the application.

8. The method according to claim 6 wherein the step of loading the subsequent server component portion is omitted if the subsequent function associated with the subsequent running portion is available from any running server component portion of the server component.

9. The method according to claim 6 further comprising the step of:

creating the parameter at a client application.

10. The method according to claim 6 further comprising the steps of:

at the client, accepting from a user, an indication of an end session;

at the client, generating an end session message;

at the server, receiving the end session message; and at the server, terminating the execution and unloading the server component portions.

11. A system including a processor for incrementally executing a client/server application, the application executed on a client and a server, wherein the client and the server are in communication over a communication link, the system comprising:

a module for providing a server application component comprising a plurality of server component portions on the server, the plurality of server component portions including an initial server component portion and one or more subsequent server component portions, the initial server component portion having an initial function, each of the one or more subsequent server component portions including a respective subsequent function; the plurality of server component portions further including a compact portion loaded and executed on the server upon receipt of a first application function request from the client component, the compact portion delivering a subset of functions applicable to commands most commonly requested to provide a fast executing initial portion of the application;

a module for providing a client component on the client, the server application component and the client component forming the client/server application, the client component including a command selector, the command selector having means for generating a parameter for use by the server application component in determining the appropriate server component portion of the plurality of server component portions to load and execute on the server to provide the selected function to the client, the parameter being an initial parameter or a subsequent parameter;

a module for loading and executing an appropriate server component portion from the plurality of server component portions in response to an initial request from the client component for an application function, the initial request including a parameter associated with the appropriate server component portion, the parameter being created at the client; and a module for loading and executing an additional appropriate server component portion of the plurality of server component portions for an additional request received from the client component for an application function not available from any running server component portion, the additional request including a parameter associated with the additional appropriate server component portion, the parameter in the additional request being created at the client.

12. A storage medium readable by a computer encoding a computer program for execution by the computer to carry out a method for incrementally executing a client/server application, the application executed on a client and a server, wherein the client and the server are in communication over a communication link, the computer program comprising:

code means for a server application component comprising a plurality of server component portions, the plurality of server component portions including an initial server component portion and one or more subsequent server component portions, the initial server component portion having an initial function, each of the one or more subsequent server component portions including a respective subsequent function, the plurality of server component portions further including a compact portion loaded and executed on the server upon receipt of a first application function request from the client component, the compact portion delivering a subset of functions applicable to commands most commonly requested to provide a fast executing initial portion of the application;

code means for a client component on the client, the server application component and the client component forming the client/server application, the client component including a command selector, the command selector having means for generating a parameter for use by the server application component in determining the appropriate server component portion of the plurality of server component portions to load and execute on the server to provide the selected function to the client, the parameter being an initial parameter or a subsequent parameter;

code means for loading and executing, an appropriate server component portion from the plurality of server component portions in response to an initial request from the client component for an application function, the initial request including a parameter associated with the appropriate server component portion, the parameter being created at the client; and code means for loading and executing, an additional appropriate server component portion of the plurality of server component portions for an additional request received from the client component for an application function not available from any running server component portion, the additional request including a parameter associated with the additional appropriate server component portion, the parameter in the additional request being created at the client.

13. A method of executing an application in an environment comprising a server and a client, the server comprising a server processor and a memory for executing a server component, the server component including an initial server component portion and one or more subsequent server component portions, the server component further including a compact portion loaded and executed on the server upon receipt of a first application function request from the client component, the compact portion delivering a subset of functions applicable to commands most commonly requested to provide a fast executing initial portion of the application; the client comprising a client component, the server component and the client component forming the application, the method comprising the steps of:

a) at the server, receiving an initial message from the client, the initial message including an initial parameter associated with the initial server component portion, the initial parameter being created by a client application;

b) at the server, loading into the memory of the server, in response to the initial parameter, the initial server component portion;

d) at the server, executing the initial server component portion in the memory to provide an initial function to the client;

e) at the server, receiving a subsequent message from the client, the subsequent message including a subsequent parameter associated with the subsequent server component portion, the subsequent parameter being created by the client application;

f) at the server, loading into the memory of the server, in dependence upon the subsequent parameter, the subsequent server component portion; and g) at the server, executing the subsequent server component portion in the memory to provide a subsequent function to the client.

14. The method according to claim 13 wherein the step of loading the subsequent server component portion is omitted if the subsequent function associated with the subsequent server component portion is available from any running server component portion of the server component.

15. The method according to claim 13 further comprising the step of:

creating the initial parameter and the subsequent parameter at a client application.

16. The method according to claim 13 further comprising the steps of:

at the client, accepting from a user, an indication of an end session;

at the client, generating an end session message;

at the server, receiving the end session message; and at the server, terminating the execution and unloading the server component portions.

17. A server for a client, the server comprising:

a memory for executing a server component, the server component including an initial server component portion and one or more subsequent server component portions, the server component futher including a compact portion loaded and executed on the server upon receipt of a first application function request from the client component, the compact portion delivering a subset of functions applicable to commands most commonly requested to provide a fast executing initial portion of the application; the client comprising a client component, the server component and the client component forming an application, means for receiving an initial message from the client, the initial message including an initial parameter associated with the initial server component portion, the initial parameter being created by a client application;

means for loading into the memory of the server, in response to the initial parameter;

means for executing the initial server component in the memory to provide an initial function to the client;

means for receiving a subsequent message from the client, the subsequent message including a subsequent parameter associated with the subsequent server component portion, the subsequent parameter being created by the client application;

means for loading into the memory of the server, in response to the subsequent parameter, the subsequent server component portion; and means for executing the subsequent server component in the memory to provide a subsequent function to the client.

18. The server according to claim 17, wherein the loading of the subsequent server component portion is omitted if the subsequent function associated with the subsequent server component portion is available from any running server component portion of the server component.

19. The server according to claim 17, wherein the client includes means for creating the initial parameter and the subsequent parameter at a client application.

20. The server according to claim 17, wherein the client includes means for accepting from a user, an indication of an end session, and means for generating, in response to the indication of an end session, an end session message, and wherein the server includes means for receiving the end session message, and means for terminating the execution and unloading from the memory, in response to the end session message, the server component portions.

* * * * *

UNITED STATES PATENT AND TRADEMARK OFFICE
CERTIFICATE OF CORRECTION

PATENT NO. : 7,467,379 B2  Page 1 of 1
APPLICATION NO. : 10/050455
DATED : December 16, 2008
INVENTOR(S) : Robert Desbiens It is certified that error appears in the above-identified patent and that said Letters Patent is hereby corrected as shown below:

In column 5, line 64, delete "comnonent" and insert --component--.

Signed and Sealed this

Twelfth Day of May, 2009

JOHN DOLL
*Acting Director of the United States Patent and Trademark Office*